(12) United States Patent  
Yan et al.

(10) Patent No.: US 10,204,162 B2
(45) Date of Patent: *Feb. 12, 2019

(54) PROVIDING CONTENT

(71) Applicant: Google Inc., Mountain View, CA (US)

(72) Inventors: Zuo Yan, Seattle, WA (US); Zhen Shen, Emu Plains (AU)

(73) Assignee: Google LLC, Mountain View, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 15/662,923

(22) Filed: Jul. 28, 2017

(65) Prior Publication Data

US 2017/0329851 A1 Nov. 16, 2017

Related U.S. Application Data

(63) Continuation of application No. 14/380,510, filed as application No. PCT/CN2012/072817 on Mar. 22, 2012, now Pat. No. 9,754,031.

(51) Int. Cl.
G06F 17/30 (2006.01)
G06F 17/21 (2006.01)

(52) U.S. Cl.
CPC ...... G06F 17/30864 (2013.01); G06F 17/212 (2013.01); G06F 17/30899 (2013.01)

(58) Field of Classification Search
None
See application file for complete search history.

(56) References Cited

U.S. PATENT DOCUMENTS

| 9,336,321 | B1* | 5/2016 | Hayden | G06F 17/30867 |
| 2004/0044566 | A1 | 3/2004 | Bostelmann et al. | |
| 2009/0307615 | A1* | 12/2009 | Jalon | G06F 3/0483 715/763 |
| 2011/0173569 | A1* | 7/2011 | Howes | G06F 17/30902 715/835 |

(Continued)

FOREIGN PATENT DOCUMENTS

| CN | 1480890 | 3/2004 |
| CN | 101042695 | 9/2007 |
| CN | 102135872 | 7/2011 |

OTHER PUBLICATIONS

International Search Report and Written Opinion in International Application No. PCT/CN2012/072817, dated Dec. 13, 2012, 10 pages.

(Continued)

Primary Examiner — Tuan-Khanh Phan
(74) Attorney, Agent, or Firm — Fish & Richardson P.C.

(57) ABSTRACT

A method includes receiving landing page information from a content provider, the landing page information being representative of one or more graphical aspects of a landing page associated with the content provider, generating a landing page image representative of the landing page based at least in part on the landing page information, the landing page image being different from the landing page, specifying an association between the landing page image and a content item associated with the content provider, generating a control for presentation along with the content item that, when activated, causes the display of the landing page image providing, in association with a resource, the content item in combination with the control.

20 Claims, 5 Drawing Sheets

(56) References Cited

U.S. PATENT DOCUMENTS

2011/0184814 A1\* 7/2011 Konkol ................. G06Q 30/02
705/14.69
2012/0206647 A1\* 8/2012 Allsbrook ............ H04N 21/434
348/461

OTHER PUBLICATIONS

International Preliminary Report on Patentability in International Application No. PCT/CN2012/072817, dated Oct. 2, 2014, 6 pages.

\* cited by examiner

PROVIDING CONTENT

CROSS-REFERENCE TO RELATED APPLICATION

This application is a continuation of U.S. application Ser. No. 14/380,510, filed Aug. 22, 2014, which is a National Stage application under 35 U.S.C. § 371 and claims the benefit of International Application No. PCT/CN2012/072817, filed Mar. 22, 2012. The disclosure of the foregoing applications are hereby incorporated by reference in their entirety.

TECHNICAL FIELD

This disclosure relates to providing content.

BACKGROUND

Content items (e.g., advertisements) can be identified by a search engine in response to a query. The query can include one or more search terms, and the search engine can identify and rank the content items based on, for example, the search terms, e.g., keywords, in the query and one or more parameters associated with the content item.

SUMMARY

Systems, methods and apparatus providing content are disclosed. In one aspect, a method includes receiving landing page information from a content provider, the landing page information being representative of one or more graphical aspects of a landing page associated with the content provider, generating a landing page image representative of the landing page based at least in part on the landing page information, the landing page image being different from the landing page, specifying an association between the landing page image and a content item associated with the content provider, generating a control for presentation along with the content item that, when activated, causes the display of the landing page image providing, in association with a resource, the content item in combination with the control.

Aspects may include one or more of the following features. Receiving the landing page information comprises receiving landing page information that was automatically extracted from the landing page. Receiving the landing page information comprises receiving one or more communications from the content provider that comprise the landing page information. Providing the content item includes providing the content item on a web site in response to a query. One or more search results are presented on the website that are responsive to the query. The landing page image is provided on the web site after the search results have been presented on the web site. The landing page image is stored in a buffer. The control comprises an clickable icon. The landing page image comprises an embedded web site. One or more requests for the landing page information are transmitted in response to an activation of the control. The landing page information comprises hyper-text markup language (HTML). The landing page is presented on the web site as a thumbnail image. One or more zoom controls are provided that, when activated, increase or decrease a magnification of the thumbnail image.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers indicate like elements.

DETAILED DESCRIPTION

Figure 1:
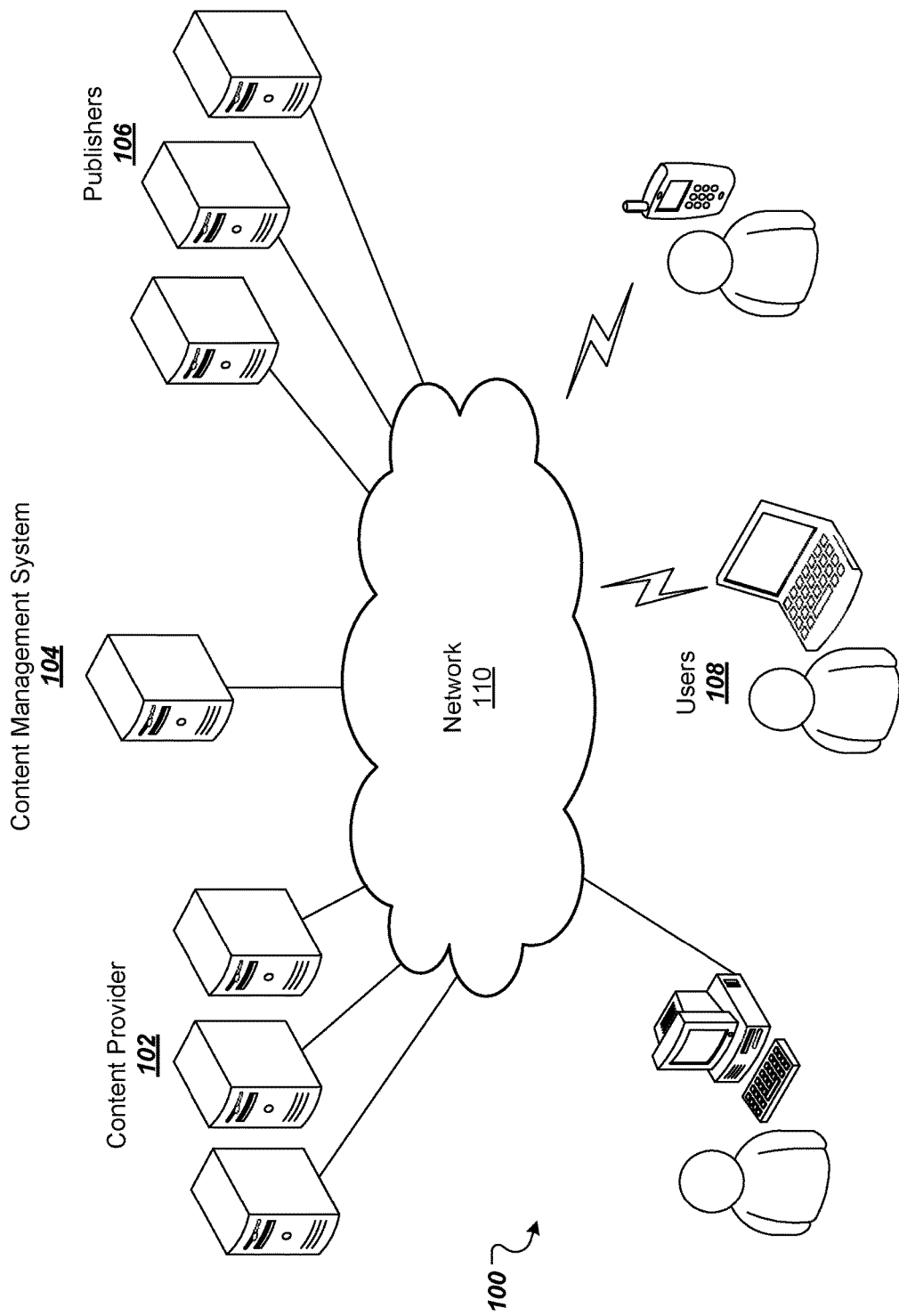
FIG. 1 is a block diagram of an example online content system.

FIG. 1 is a block diagram of an exemplary online content system 100. In some implementations, one or more content providers 102 (e.g., advertisers) can directly, or indirectly, enter, maintain, and track content item information in a content management system 104. The content items (e.g., advertisements) may be in the form of graphical content items, such as banner content items, text only content items, image content items, audio content items, video content items, content items combining one of more of any of such components, etc. The content items may also include embedded information, such as a links, meta-information, and/or machine executable instructions.

In general, a content item refers to any form of communication in which one or more products, services, ideas, messages, people, organizations or other items are identified and promoted (or otherwise communicated). Content items are not limited to commercial promotions or other communications. A content item may be a public service announcement or any other type of notice, such as a public notice published in electronic press or a broadcast. A content item may be referred to or include sponsored content. One or more publishers 106 may submit requests for content items to the system 104. The content management system 104 responds by sending content items to the requesting publisher 106 (or directly to an end user) for placement on one or more of the publisher's web properties (e.g., websites and other network-distributed content). The content items can include embedded links to landing pages, e.g., pages on websites of the content providers 102, that a user is directed to when the user clicks a content item presented on a publisher website. Though reference is made to advertising, other forms of content, including other forms of sponsored content, can be delivered by the system 100.

Other entities, such as the users 108 and the content providers 102, can provide usage information to the system 104, such as, for example, whether or not a conversion or click-through related to a content item has occurred. This usage information can include measured or observed user behavior related to content items that have been served (e.g., presented to the user on a user interface of the user's computer, mobile telephone, or other computing device. For example, in contrast to an impression which occurs when a user views one of the content items (such as when a page of content including the content item is displayed and/or rendered to the user), a "click-through" may be said to occur when a user selects a presented content item by clicking on the content item, embedded hypertext links, executable code, and/or any type of user selection related to the presented content item, where the click or another type of selection typically directs the user to the content provider's web site or the content provider's online or real world presence. A conversion may be said to occur when a user consummates a transaction related to a previously served content item. What constitutes a conversion may vary from case to case and may be determined in a variety of ways. For example, it may be the case that a conversion occurs when a user clicks on a content item, is referred to the content provider's web page, and consummates a purchase there before leaving that web page. Alternatively, a conversion may be defined as a user being shown a content item, and making a purchase on the content provider's web page within a predetermined time (e.g., within seven days). Many other definitions of what constitutes a conversion are possible. In response to a conversion or other action, the system 104 can perform financial transactions, such as crediting the publishers 106 and charging the content providers 102 based on the usage information.

A computer network 110, such as a local area network (LAN), wide area network (WAN), the Internet, or a combination thereof, connects the content providers 102, the system 104, the publishers 106, and the users 108.

One example of a publisher 106 is a general content server that receives requests for content (e.g., articles, discussion threads, music, video, graphics, search results, web page listings, information feeds, etc.), and retrieves the requested content in response to the request. The content server (or a user that is accessing the content source by way of a redirect) may submit a request for content items to a content item server in the system 104. The content item request may include a number of content items desired. The content item request may also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more of the content items provided by the system 104. This combined content and content items can be sent to the user 108 that requested the content for presentation in a viewer (e.g., a browser or other content display system). Alternatively, the content can be combined at a user's device (e.g., by combining in a user's browser content from the content source with content items provided by the system 104). The content server can transmit information about the content items back to the content item server, including information describing how, when, and/or where the content items are to be rendered (e.g., in HTML or JavaScript™).

Another example of a publisher 106 is a search service. A search service can receive queries for information based on one or more user-entered keywords. In response, the search service can retrieve relevant search results from an index of documents (e.g., from an index of web pages). Search results can include, for example, lists of web page titles, snippets of text extracted from those web pages, and hypertext links to those web pages, and may be grouped into a predetermined number of (e.g., ten) search results.

The search service can submit a request for content items to the system 104. The request may include a number of content items desired. This number may depend on the search results, the amount of screen or page space occupied by the search results, the size and shape of the content items, etc. In some implementations, the number of desired content items will be from one to ten, or from three to five. The request for content items may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search service can combine the search results with one or more of the content items provided by the system 104. This combined information can then be forwarded to the user 108 that requested the content. The search results can be maintained as distinct from the content items, so as not to confuse the user between paid content items and presumably neutral search results.

Finally, the search service can transmit information about the content item and when, where, and/or how the content item was to be rendered back to the system 104.

As can be appreciated from the foregoing, the content management system 104 can serve publishers 106, such as content servers and search services. The system 104 permits serving of content items targeted to documents or content served by content servers. For example, a network or inter-network may include a content item server serving targeted content items in response to requests from a search service with content item spots for sale. Suppose that the inter-network is the World Wide Web. The search service crawls much or all of the content. Some of this content will include content item spots (also referred to as "inventory") available. More specifically, one or more content servers may include one or more documents. Documents may include web pages, email, content, embedded information (e.g., embedded media), meta-information and machine executable instructions, and content item spots available. The content items inserted into content item spots in a document can vary each time the document is served or, alternatively, can have a static association with a given document.

In some examples, the content item management system 104 may include an auction process to select content items. Content providers may be permitted to select, or bid, an amount the content providers are willing to pay for each click of a content item, e.g., a cost-per-click amount a content provider pays when, for example, a user clicks on a content item. The cost-per-click can include a maximum cost-per-click, e.g., the maximum amount the content provider is willing to pay for each click of content item based on targeting criteria (e.g., one or more keywords). For example, content providers A, B, and C all select, or bid, a maximum cost-per-click of $0.50, $0.75, and $1.00, respectively. The maximum amount content provider A will pay for a click is $0.50, the maximum amount content provider B will pay is $0.75, and the maximum amount content provider C will pay is $1.00.

The rank of a content item that is displayed can be determined by combining (e.g., multiplying) the maximum cost-per-click for the content item by a quality score of the content item. In general, the quality score represents the amount of user interest a particular content item is likely to generate given a particular query. The content item can then be placed among other content items in order of increasing or decreasing rank. For example, suppose the quality score of content providers A, B, and C are "3," "1," and "1," respectively. The rank of content provider A, B, and C can be determined as follows:

A: Rank=quality score×maximum cost-per-click=3.0× $0.50=1.50

B: Rank=quality score×maximum cost-per-click=1.0× $0.75=0.75

C: Rank=quality score×maximum cost-per-click=1.0× $1.00=1.00

The content providers can be ranked in decreasing order as follows:

---

1. A
2. C
3. B

---

The content items can also be priced and ordered according to a second price auction. In addition to the cost-per-click of the content item and the quality score of the content item, a second price auction may compute the price of a content item at bidding time by considering the amount selected or bid by the content provider directly ranked below a given content item. For example, the "second price" (sometimes referred to as an "actual cost per click") of a content item can be the price that is necessary to keep the content item's position above the next content item. To determine the second price, the system 104 can determine how much the content provider in position 1 would have to pay to give them a rank equal to the content provider in position 2, and then the system 104 adds a unit amount, e.g., $0.01, to this determined amount.

To determine how much the content provider in position 1 would have to pay to give them a rank equal to the content provider in position 2, the rank of position 2 can be divided by the quality score of position 1 and $0.01 can be added to that amount. The last content provider in the list can pay a minimum cost-per-click to hold the position in the list. For example, suppose the minimum cost-per-click is $0.20. The second price of content providers A, B, and C can be determined as follows:

A: C's rank/A's quality score=⅓=$0.33+$0.01=$0.34
C: B's rank/C's quality score=0.75/1=$0.75+$0.01=$0.76
B: minimum cost-per-click=$0.20

In this example, A would only have to pay $0.34 to hold the first position in the list of content items. C would have to pay $0.76 to hold the second position. Content provider B would be required to pay the minimum cost-per-click amount of $0.20.

Another metric for ranking and valuing content items is effective cost-per-thousand impressions (eCPM). The eCPM value represents the estimated earnings for every 1000 "impressions" an content provider receives. An impression refers to the number of times a web page or pages containing a particular content item are shown to page visitors.

When the cost-per-click is known, such as in the auction scheme described above, eCPM can be calculated according to the following formula:

eCPM=1000×CPC×(Probability of Click)

The probability of click factor can be supplied based on historical data associated with a content item, a merchant, industry-wide data, or other factors. Thus, when an content provider provides a cost-per-click bid, the eCPM formula can represent an content provider's estimated earnings for every 1000 impressions received. Second price auctions such as those described above can also use eCPM values to create a second price value for a content item.

Figure 2:
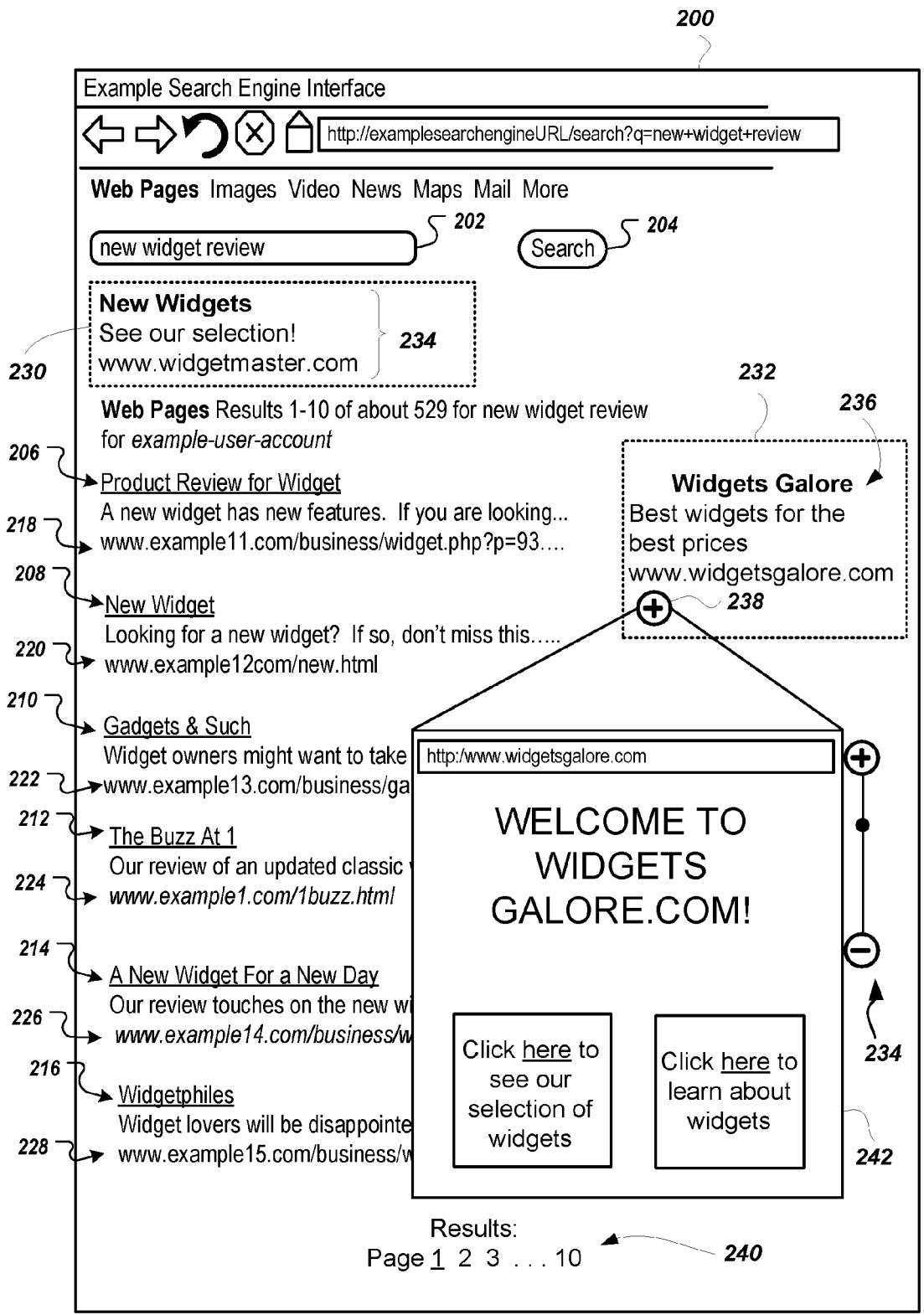
FIG. 2 illustrates an example search results page.

FIG. 2 illustrates a portion of a search results page 200. In general, the search results page 200 includes multiple items of web content (e.g., search results) arranged in combination with content items.

The search results page 200 includes a query input field 202 and a search button 204. Entry of a query into the query input field 202 and selection of the search button 204 causes the query to be submitted to a search engine (e.g., publisher 106) which, in turn, provides the search results page 200. In this example, the search results include search results 206, 208, 210, 212, 214, and 216. The search results 206, 208, 210, 212, 214, and 216 include a respective resource locator (e.g., a URL) 218, 220, 222, 224, 226, and 228 that specifies the location of a corresponding resource. Each corresponding resource may be hosted by one or more of the publishers 106.

The search results page 200 also includes a top content item location 230 and a side content item location 232. The top content item location 230 includes a content item 234, and the side content item location 232 includes a content item 236. The search results 206, 208, 210, 212, 214, and 216 and the content items 234, 236 are in some way relevant to the query "new widget review" provided in query input field 202. For example, the search result 206 (which, in some examples, may be considered the "best" or "most relevant" result) is related to the query in that it provides products reviews for a widget. Similarly, the content item 236 advertises an opportunity to purchase the "best widgets" at the "best prices." As discussed above, in some examples, the content items 234, 236, 238 can be selected by the content management system 104 based on both their quality scores (which includes, among other things, the relevance of the content items to the query) and their associated bid amounts. In some examples, the top content item location 230 and the side content item location 232 may be associated with content items of a particular quality. For example, the top content item location 230 may be associated with (e.g., reserved for, or configured to present) the best content item, while the side content item location may be associated with lesser content items.

The search results page 200 also includes a page identifier 240. In this example, the page identifier 240 indicates that the results page 200 is the first page of search results. Users may proceed to different pages of search results by activating controls associated with the page identifier 240 (e.g., by clicking the "2" icon, a user may advance to the second page of search results). Advancing to the second page of search results may cause the results page 200 to present one or more additional search results (e.g., in an order of descending relevance or quality) as well as one or more additional content items.

In some examples, content items presented on the search page can include (or can be presented in combination with) enhanced features and content. For example, the content item 232 includes a control 238 that, when activated, causes the presentation of a landing page preview. A landing page preview can be, for example, an image (e.g., a thumbnail image) of a web page that is associated with an content provider and/or content item, or the landing page preview can be presented in other formats (e.g., a live dynamic element updateable by one or more of the content management system 104, the publishers 106, and the content providers 102). Using FIG. 2 as an example, if a user activates the control 238 (e.g., by clicking on the control or by hovering over the control with a cursor controlled by an input device, such as a mouse) that is presented with the content item 236, a landing page preview 242 can be presented on the search results page 200. As shown in FIG. 2, content item 236 is associated with the web site www-.widgetsgalore.com. As such, the landing page preview 242 presented as a result of the activation of the control 238 is also associated with the web site (e.g., the content provider) www.widgetsgalore.com. In some examples, allowing users to view a landing page that is associated with a content item can lend credibility to the content item and can increase the user's level of trust with both the content provider and with the concept of online content items in general. Because users can be provided with a preview of a landing page associated with a content item, users may feel more comfortable with clicking on the content item, and may be more likely to click on the content item as a result. In some examples, clicking on the landing page preview 242 will direct a user to the content provider's web site.

The landing page preview 242 can be presented in combination with a zoom control 234 that can be used to manipulate the level of zoom on various regions of the landing page preview 242. Because the landing page preview 242 can be a thumbnail image (e.g., a small image), users may wish to zoom in on a particular aspect of the landing page preview 242 in order to increase the visibility of that particular aspect. The landing page preview 242 can also include other presentation controls, such as one or more scroll bars (e.g., controls for shifting the landing page preview 242 both vertically and horizontally within a viewing area) and a "minimize" and/or "exit" control that causes the landing page preview 242 to be temporarily minimized to the background or closed.

The content item 236 may be associated with any number of landing page previews. For example, the content item 236 may include the control 238 as well as one or more additional controls that are associated with respective landing pages. A content item could also be associated with a rotation of landing page previews, such that activation of the control 238 causes a landing page preview to be displayed at random (or in a predefined sequence or order) from the rotation. Content items do not necessarily need to include separate controls for displaying landing page previews (e.g., separate graphical representations, such as the icon that represents the control 238). Instead of separate controls (or in addition to separate controls), landing page previews can be presented automatically, or can be presented as a result of a user positioning a mouse cursor in the vicinity of the content item. For example, the presentation of the landing page preview 242 could also be triggered by a user positioning a mouse cursor within the side content item location 232, or on or near the content item 236.

The manner in which landing page previews are displayed can be preconfigured (e.g., by the content item management system 104) and/or can be configured according to one or more user-defined or content provider-defined preferences. For example, landing page previews can be targeted based on information associated with the user (e.g., different landing page previews can be presented based on an identity of the user who is viewing the search results page 200). Furthermore, a landing page preview can be selected from among multiple landing page previews for presentation on the search results page based on one or more selection factors. For example, a landing page preview can be selected based on a performance (e.g., a logged historical performance represented by CTR and/or conversion rates) of that landing page preview.

Figure 3:
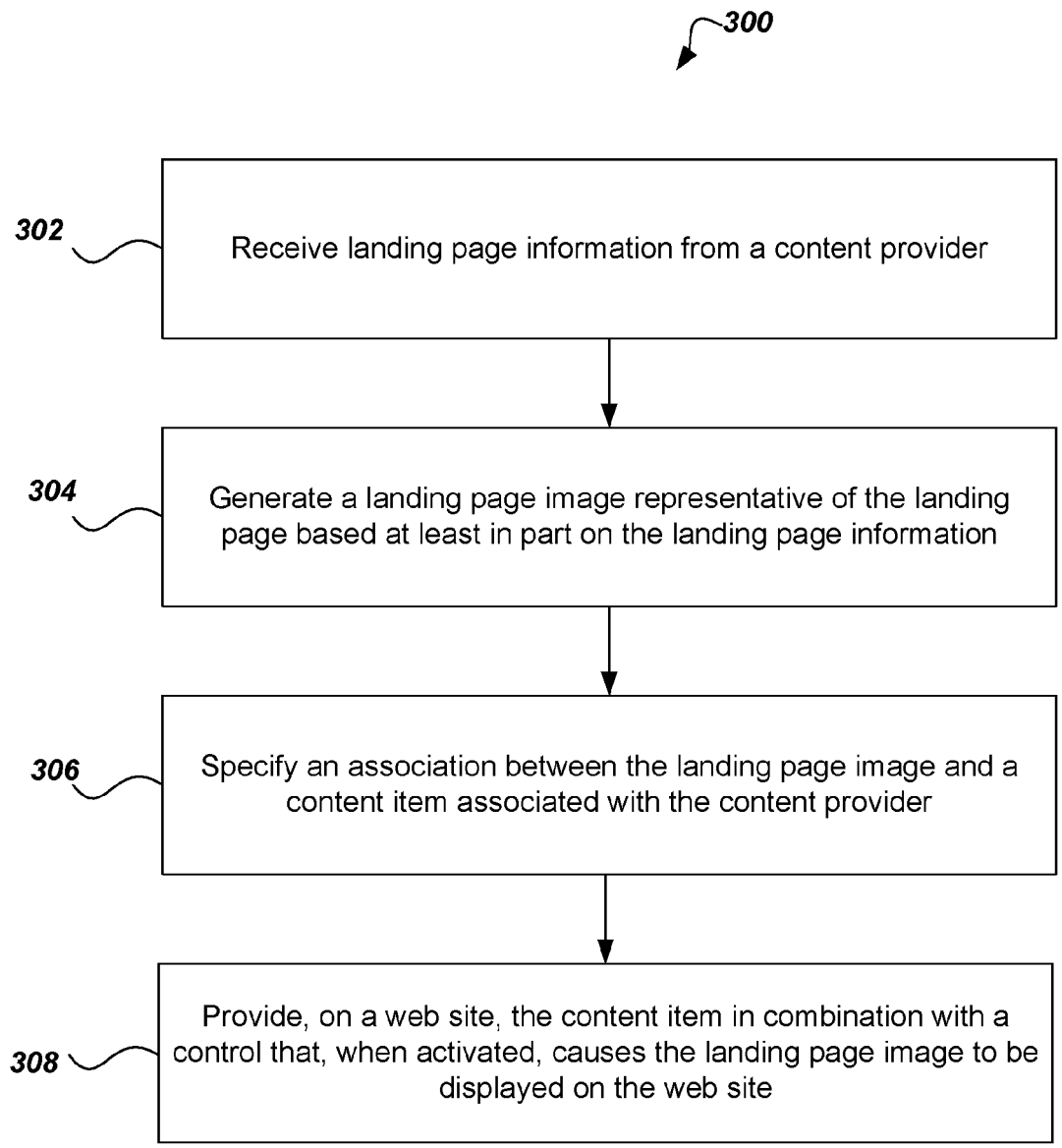
FIG. 3 is a flow chart that illustrates an example process for providing one or more content items.

FIG. 3 shows an example process 300 for providing landing page previews. Landing page information is received from a content provider (302). For example, the content management system 104 can receive landing page information from a content provider that defines a landing page associated with that content provider. The landing page information can include executable computer code (e.g., hypertext markup language (HTML) code) that can be used to render or otherwise provide one or more image files. For example, the landing page information can specify dimensions, colors, and content associated with a content provider's landing page. In some examples, the landing page information is an image (e.g., a .JPEG file) that graphically represents an content provider's landing page.

The landing page information can be received (e.g., by the content item management system 104) using a variety of techniques. For example, content providers (or other entities) can transmit one or more communications to the content item management system 104 that include the landing page information. For example, content providers could submit one or more web forms provided by the content management system 104 that include the landing page information, or could simply provide the landing page information to the content management system 104 via one or more telephone calls or emails that specify the landing page information. Using this technique allows content providers the opportunity to provide the landing page information in a customizable fashion. In some examples, the landing page information is received as a result of one or more web crawling processes. For example, one or more automated processes could crawl a landing page associated with an content provider to extract landing page information from the landing page. The content management system 104 could then receive the extracted landing page information as a result of the execution of the web crawling process (e.g., from an entity that manages the web crawling process, or by running the web crawling process in an engine associated with the content management system 104).

A landing page image representative of the landing page is generated based at least in part on the landing page information (304). For example, the content management system 104 can use the received landing page information to generate an image that graphically represents a landing page associated with an content provider. In some examples, if the landing page information included executable computer code, generating the landing page image could include executing some or all of the computer code received from the content provider. If the landing page information included an image received from the content provider (e.g., received by direct submission from the content provider, or as a result of one or more web crawling processes), generating the landing page image can include formatting the received image (e.g., resizing the image, centering the image, cropping the image, or changing other aspects of the image), or can include using the received image as is (e.g., loading the received image into memory without altering the image).

An association is specified between the landing page image and a content item associated with the content provider (306). For example, the content management system 104 may specify a relationship between the landing page image and the content provider that is associated with the landing page represented by both the landing page image and the landing page information. Associations between multiple content items and a single landing page image may be specified. For example, the content management system could specify that a given landing page image will be associated with all content items associated with a given content provider. On the other hand, as discussed above, the content management system 104 can also specify associations between multiple landing pages and a single content provider or a single content item (e.g., using landing page preview rotations).

A content item is provided in combination with a control that, when activated, causes the landing page image to be graphically displayed on the web site (308). For example, a content item can be provided on a web site (e.g., the search results page 200 (FIG. 2)) in combination with a control that can be activated by a user. The control may be a separate control (e.g., the control 238 (FIG. 2)), or the control can be a part of the content item (e.g., the control could be activated by a user hovering a mouse cursor in the vicinity of the content item). Activation of the control causes the landing page image generated from the received landing page information to be presented on the web site. As in the example of FIG. 2, the landing page image can be presented as a thumbnail image in a "pop-up" style to overlap other information presented on the web site. Providing the landing page image can also include providing controls to alter the presentation of the landing page image, such as zoom controls, scroll controls, and the like.

Figure 4:
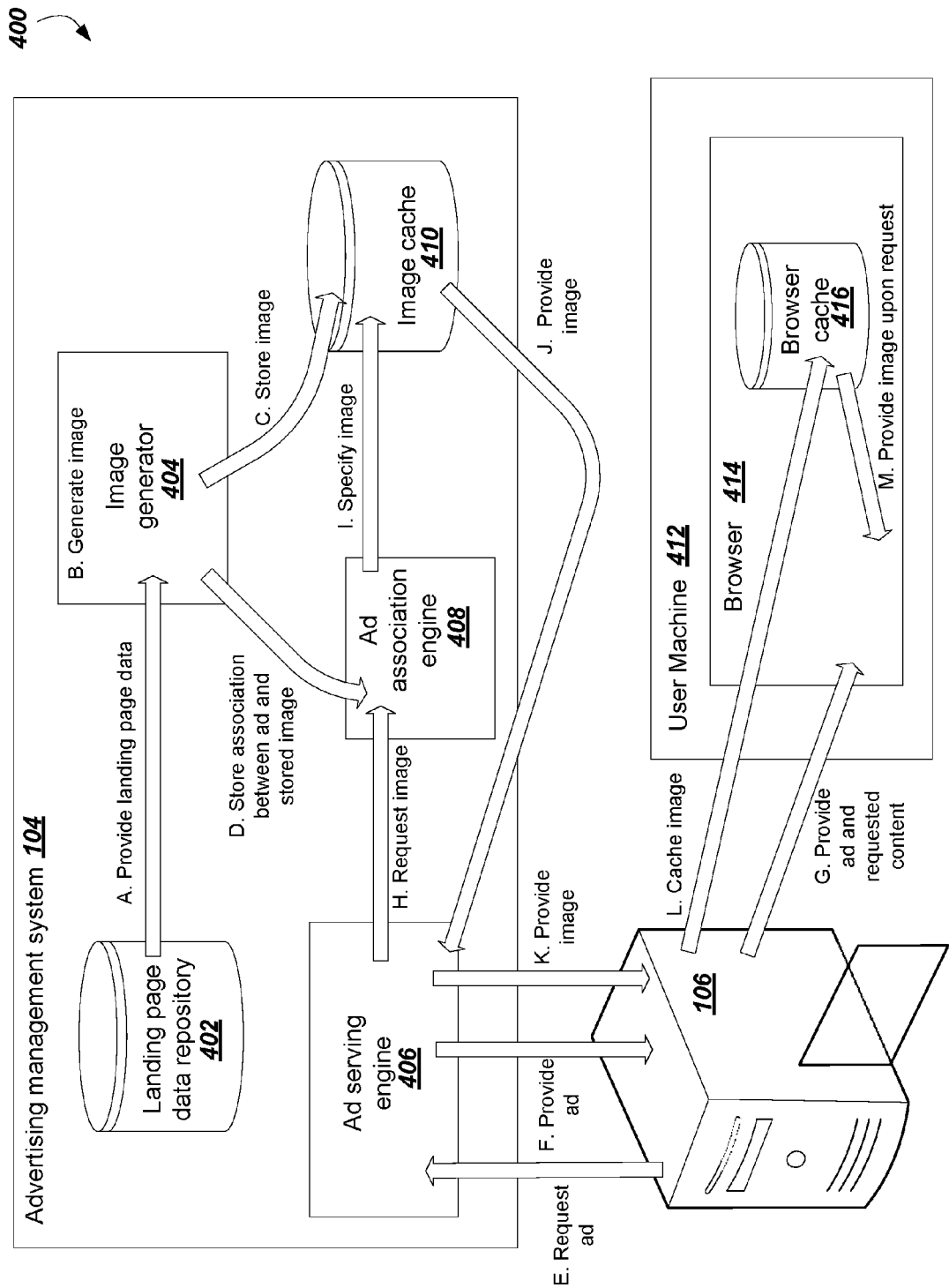
FIG. 4 illustrates an example work flow for providing one or more content items.

FIG. 4 shows an example workflow in a system 400 that includes the content management system 104, a user machine 412, and the publisher 106. While in this example, the content management system 104 includes a landing page data repository 402, an image generator 404, a content item serving engine 406, a content item association engine 408, and an image cache 410, any or all of these modules may be implemented in entities that are separate from the content management system 104. In this example workflow, it will be assumed that landing page information has already been received for a particular landing page using any of the techniques described above and stored in a landing page data repository 402.

In state A, the landing page data repository 402 provides landing page data to an image generator 404. As described above, the landing page data can include executable code (e.g., HTML code), one or more image files, or metadata. The landing page data repository 402 may provide the landing page data in response to a request from another entity (e.g., a request received from the ad serving engine 406), or it may provide the landing page data based on a predetermined schedule or based on one or more triggering events. For example, the landing page data repository 402 can be configured to provide landing page data to the image generator 404 after a predetermined amount of landing page data has been acquired, or after a system administrator has requested that the landing page data be processed by the image generator 404.

In state B, the image generator 404 generates an image of a landing page based at least in part on the landing page data retrieved from the landing page data repository. The image generator 404 may execute code provided by the landing page data repository 402 to render the landing page image, or may use raw data provided by the landing page data repository 402 to generate the landing page image. In some examples, the landing page data includes one or more complete images, and generating the image may include formatting the existing image(s) provided by the landing page data repository 402.

In state C, the image generator 404 provides the generated landing page image for storage in the image cache 410. In some examples, the image cache 410 is a database that is capable of storing and organizing a large number of landing page images. The image cache 410 can also be a buffer that stores a smaller number of landing page images as they are requested by other entities, such as the content item serving engine 406 and/or the content item association engine 408. For example, if the image generator 404 generates a landing page image in response to a received request for a content item, the image cache 410 may serve as a short term buffer for the image that was generated on demand. In the example of FIG. 4, the image cache 410 stores the generated landing page images on a more permanent basis, and may receive such images well before requests for those images are received.

In state D, the content item association engine 408 stores an association between the landing page image stored in the image cache 410 and an content provider and/or content item that is associated with the landing page data that was used to generate the landing page image. For example, if the landing page image was generated from data extracted from a website associated with Merchant X, the content item association engine 408 may store an association between the landing page image and all content items associated with Merchant X.

In state E, the content item serving engine 406 receives a request for a content item from the publisher 106. In response, the content item serving engine 406 may select an appropriate content item to serve on a web page requested by the user machine 412 (e.g., using the auction techniques described above). In state F, the content item serving engine 406 may serve the selected content item to the publisher 106, which may then in turn provide the content item and the requested content to the user machine 412 (e.g., in a browser of the user machine 412) in state G. Using these techniques, the content requested by the user machine 412 and one or more relevant content items can be provided to the browser 414 of the user machine 412 as quickly as possible.

In state H, the content item serving engine 406 requests a landing page image from the content item association engine 408 that can be provided in combination with the selected content item, even if the selected content item has already been presented to the user machine 412. If the content item association engine 408 determines that there are one or more images stored in the image cache 410 that are associated with the selected content item, the content item association engine 408 can specify, in state I, one or more landing page images that will be provided to the user machine 412. In state J, the image cache 410 provides the landing page image specified by the content item association engine 408 to the content item serving engine 406 (e.g., by allowing the content item serving engine 406 to access the specified landing page image or by transferring the specified landing page image to memory associated with the content item serving engine 406).

In state K, the landing page image is provided to the publisher 106 which, in turn, may load the landing page image into a browser cache 416 associated with the browser 414 running on the user machine 412. In some examples, loading the landing page image into the browser cache 416 allows landing page images to be provided to the user machine 412 in the background and prevents a user from experiencing load times that are longer than expected. In some examples, the landing page image can be loaded directly into the browser 414 for display on the web page along with the content item and the requested content.

In state M, the landing page image is provided on the web page in response to a request to view the landing page image. For example, the landing page image can be presented on the web page in response to the activation of one or more controls presented on the web page, as described above.

Furthermore, while some aspects of the workflow may occur in response to the receipt of a user-initiated query (e.g., the entry of a search query in a browser 414 operating on the user machine 412), the user-initiated query is not illustrated in FIG. 4 for simplicity. The states A-M may occur in an order that is different from the order implied by their alphabetic labels. For example, while state A is shown as the first state in the workflow, state A could occur after, for example, state E (e.g., landing page data could be provided to an image generator 404 after or upon receipt of a request for a content item by the ad serving engine 406). One or more of the states may also occur or be reached simultaneously. For example, states C and D may occur nearly or completely simultaneously if the image generator 404 stores an image in the image cache 410 while storing an association in the content item association engine 408 at roughly the same time. In some examples, the content requested by the user machine 412 and/or one or more content items are provided to the user machine 412 before performing some or all of the states associated with generating, selecting, or providing a landing page image.

Figure 5:
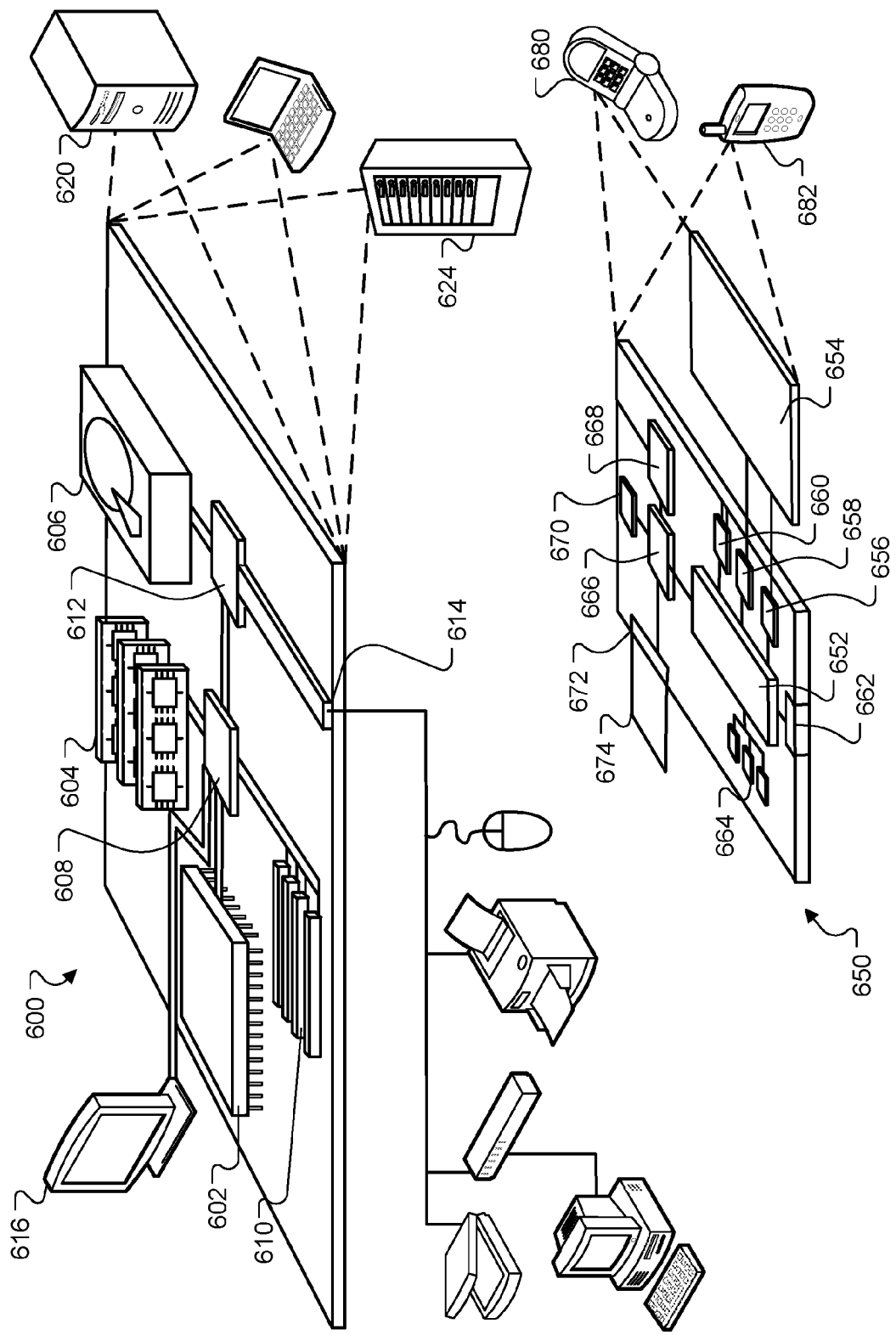
FIG. 5 is a diagram of an example computing system.

FIG. 5 shows an example of a computing device 600 and a mobile computing device 650 that can be used to implement the techniques described in this disclosure. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method comprising:
    generating, for a given landing page of a content item, a landing page image that visually depicts the given landing page based at least in part on markup language defining the given landing page, the landing page image being an image file that is different from the markup language defining the given landing page;
    designating the landing page image as a preview of the given landing page based on the content item including an active link that initiates a request for the given landing page in response to user interaction with the content item;
    generating a control that, when activated while the content item is presented in a given web page, causes the preview of the given landing page to be presented in the given web page while the given web page is presented at a client device rather than initiating a request for the given landing page;
    determining a graphical parameter of the landing page image that represents a candidate visual aspect of the landing page that can be altered;
    determining, based on a history of user interactions of a particular user stored at the client device, a value of the graphical parameter that has historically generated at least a threshold amount of interest from the particular user calculated based on the history of user interactions of the particular user with previous content that included the value of the graphical parameter relative to other content that included a different value of the graphical parameter;
    providing the content item in combination with the control and the preview of the given landing page to the client device that is presenting a search results page, wherein the preview of the given landing page (i) is cached at the client device, (ii) is presented instead of the given landing page, and without leaving the given web page, at the client device in response to user interaction with the control, and (iii) is dynamically altered such that the value of at least one visual parameter of the preview of the given landing page is altered to match the determined graphical parameter value.

2. The method of claim 1, comprising automatically extracting landing page information from the given landing page, wherein the extracted landing page information includes one or more graphical aspects of the given landing page that are used to generate the landing page image.

3. The method of claim 1, wherein providing the content item includes providing the content item on a web site in response to a query.

4. The method of claim 3, further comprising presenting, on the web site, one or more search results that are responsive to the query.

5. The method of claim 4, further comprising providing the preview of the given landing page on the web site after the search results have been presented on the web site; and
    wherein providing the content item in combination with the control and the preview of the given landing page to the client device that is presenting a search results page comprises selecting, from among multiple landing page previews based on at least one selection factor of each particular one of the multiple previews of the given landing page that indicates a historical performance of the particular one of the previews of the landing page.

6. The method of claim 1, wherein the image is cached at the client device and presented at the client device in response to a hover of a pointer over with the control.

7. The method of claim 1, further comprising providing one or more zoom controls that, when activated, increase or decrease a magnification of the landing page image.

8. One or more computer storage devices comprising instructions that, when executed by one or more processing devices, cause the one or more processing devices to perform operations comprising:
    generating, for a given landing page of a content item, a landing page image that visually depicts the given landing page based at least in part on markup language defining the given landing page, the landing page image being an image file that is different from the markup language defining the given landing page;
    designating the landing page image as a preview of the given landing page based on the content item including an active link that initiates a request for the given landing page in response to user interaction with the content item;
    generating a control that, when activated while the content item is presented in a given web page, causes the preview of the given landing page to be presented in the given web page while the given web page is presented at a client device rather than initiating a request for the given landing page;
    determining a graphical parameter of the landing page image that represents a candidate visual aspect of the landing page that can be altered;
    determining, based on a history of user interactions of a particular user stored at the client device, a value of the graphical parameter that has historically generated at least a threshold amount of interest from the particular user calculated based on the history of user interactions of the particular user with previous content that included the value of the graphical parameter relative to other content that included a different value of the graphical parameter;
    providing the content item in combination with the control and the preview of the given landing page to the client device that is presenting a search results page, wherein the preview of the given landing page (i) is cached at the client device, (ii) is presented instead of the given landing page, and without leaving the given web page, at the client device in response to user interaction with the control, and (iii) is dynamically altered such that the value of at least one visual parameter of the preview of the given landing page is altered to match the determined graphical parameter value.

9. The one or more computer storage devices of claim 8, wherein the instructions cause the one or more processing devices to perform operations comprising automatically extracting landing page information from the given landing page, wherein the extracted landing page information includes one or more graphical aspects of the given landing page that are used to generate the landing page image.

10. The one or more computer storage devices of claim 8, wherein providing the content item includes providing the content item on a web site in response to a query.

11. The one or more computer storage devices of claim 10, wherein the instructions cause the one or more processing devices to perform operations comprising presenting, on the web site, one or more search results that are responsive to the query.

12. The one or more computer storage devices of claim 11, wherein the instructions cause the one or more processing devices to perform operations comprising providing the preview of the given landing page on the web site after the search results have been presented on the web site; and
wherein providing the content item in combination with the control and the preview of the given landing page to the client device that is presenting a search results page comprises selecting, from among multiple landing page previews based on at least one selection factor of each particular one of the multiple previews of the given landing page that indicates a historical performance of the particular one of the previews of the landing page.

13. The one or more computer storage devices of claim 8, wherein the image is cached at the client device and presented at the client device in response to a hover of a pointer over with the control.

14. A system comprising:
one or more processing devices; and
one or more computer storage devices comprising instructions that, when executed by one or more processing devices, cause the one or more processing devices to perform operations comprising:
generating, for a given landing page of a content item, a landing page image that visually depicts the given landing page based at least in part on markup language defining the given landing page, the landing page image being an image file that is different from the markup language defining the given landing page;
designating the landing page image as a preview of the given landing page based on the content item including an active link that initiates a request for the given landing page in response to user interaction with the content item;
generating a control that, when activated while the content item is presented in a given web page, causes the preview of the given landing page to be presented in the given web page while the given web page is presented at a client device rather than initiating a request for the given landing page;
determining a graphical parameter of the landing page image that represents a candidate visual aspect of the landing page that can be altered;
determining, based on a history of user interactions of a particular user stored at the client device, a value of the graphical parameter that has historically generated at least a threshold amount of interest from the particular user calculated based on the history of user interactions of the particular user with previous content that included the value of the graphical parameter relative to other content that included a different value of the graphical parameter;
providing the content item in combination with the control and the preview of the given landing page to the client device that is presenting a search results page, wherein the preview of the given landing page (i) is cached at the client device, (ii) is presented instead of the given landing page, and without leaving the given web page, at the client device in response to user interaction with the control, and (iii) is dynamically altered such that the value of at least one visual parameter of the preview of the given landing page is altered to match the determined graphical parameter value.

15. The system of claim 14, wherein the instructions cause the one or more processing devices to perform operations comprising automatically extracting landing page information from the given landing page, wherein the extracted landing page information includes one or more graphical aspects of the given landing page that are used to generate the landing page image.

16. The system of claim 14, wherein providing the content item includes providing the content item on a web site in response to a query.

17. The system of claim 16, wherein the instructions cause the one or more processing devices to perform operations comprising presenting, on the web site, one or more search results that are responsive to the query.

18. The system of claim 17, wherein the instructions cause the one or more processing devices to perform operations comprising providing the preview of the given landing page on the web site after the search results have been presented on the web site; and
wherein providing the content item in combination with the control and the preview of the given landing page to the client device that is presenting a search results page comprises selecting, from among multiple landing page previews based on at least one selection factor of each particular one of the multiple previews of the given landing page that indicates a historical performance of the particular one of the previews of the landing page.

19. The system of claim 14, wherein the image is cached at the client device and presented at the client device in response to a hover of a pointer over with the control.

20. The system of claim 14, wherein the instructions cause the one or more processing devices to perform operations comprising providing one or more zoom controls that, when activated, increase or decrease a magnification of the landing page image.

* * * * *